United States Patent
Sudhi

(10) Patent No.: US 8,296,650 B2
(45) Date of Patent: Oct. 23, 2012

(54) TECHNIQUE TO IMPROVE DATA ENTRY EFFICIENCY IN A USER INTERFACE

(75) Inventor: Suraj Sudhi, Kerala (IN)

(73) Assignee: SAP AG, Walldorf (DE)

( * ) Notice: Subject to any disclaimer, the term of this patent is extended or adjusted under 35 U.S.C. 154(b) by 837 days.

(21) Appl. No.: 12/342,076

(22) Filed: Dec. 23, 2008

(65) Prior Publication Data

US 2010/0162159 A1 Jun. 24, 2010

(51) Int. Cl.
*G06F 3/048* (2006.01)
(52) U.S. Cl. ............... 715/253; 715/780; 715/243
(58) Field of Classification Search .............. 715/780, 715/243, 253
See application file for complete search history.

(56) References Cited

U.S. PATENT DOCUMENTS

| 5,897,670 A * | 4/1999 | Nielsen .................. 715/866 |
| 2005/0097008 A1* | 5/2005 | Ehring et al. ............... 705/26 |
| 2007/0192710 A1* | 8/2007 | Platz et al. ................ 715/764 |

* cited by examiner

*Primary Examiner* — Weilun Lo
*Assistant Examiner* — Amy M Levy

(57) ABSTRACT

Disclosed is a method and system for generating a user interface with a plurality of data fields ordered in a most frequently accessed first basis. The method involves retrieving a plurality of data fields of a user interface from a user interface metadata file and retrieving an access count of each of the plurality of data fields, wherein the access count is a count of number of data entry processes in which the plurality of data fields are accessed. The plurality of data fields are arranged in a most frequently accessed first basis based on the access count of each of the plurality of data fields.

18 Claims, 5 Drawing Sheets

| 1 | F1 | TITLE OF INVENTION: | METHOD TO IMPROVE DATA ENTRY EFFICIENCY BY CHANGING THE ORDER | | | | 105 |
|---|---|---|---|---|---|---|---|
| 2 | F2 | LEAD INVENTOR | INVENTOR DATA | | EMPLOYER / ON SECONDMENT | | CONTRIBUTION |
| | | 1 | EMAIL: | ABC@XYZ.COM | EMPLOYER: | XYZ PVT. | 100.0 % |
| | | | FIRST NAME: | AB | EXTERNAL INVENTOR: | ☐ YES | |
| | | | LAST NAME: | C | ON SECONDMENT: | ☐ YES | |
| | | | XYZ USER ID: | 1047201 | | | |
| 3 | F3 | WAS THE INVENTION DEVELOPED IN THE COURSE OF A PROJECT DONE WITH A PERSON OR COMPANY OUTSIDE OF XYZ?     ⦿ NO ○ YES | | | | | 115 |
| 4 | F4 | WAS THE INVENTION FUNDED DIRECTLY OR INDIRECTLY BY A PUBLIC FUNDING PROGRAM?     ⦿ NO ○ YES | | | | | 120 |
| 5 | F5 | WAS THE INVENTION MADE WITHIN THE U.S.?<br>⦿ NO   ○ YES (PLEASE FILL IN BELOW) | | | | | 125 |
| 6 | F6 | OBJECTIVE OR PURPOSE OF INVENTION | | | | | 130 |
| | F6A | WHAT IS THE UNDERLYING QUESTION / PROBLEM / TASK OF THE INVENTION? | | | | | |
| | F6B | HOW IS THE QUESTION / PROBLEM / TASK SOLVED? | | | | | |
| | F6C | CLOSEST KNOW RELATED PRIOR ART? | | | | | |
| | F6D | DIFFERENCES AND / OR ADVANTAGES FROM PRIOR ART? | | | | | |
| 7 | F7 | COMMERCIALISATION OF THE INVENTION | | | | | 135 |
| | F7A | HAS THE INVENTION BEEN DVUGED TO NON-XYZ EMPLOYEES?<br>○ NO ○ YES | | | | | |
| | F7B | IS THE INVENTION USED OR PLANNED TO BE USED BY XYZ IN A PRODUCT OR SERVICE OFFERING?     ○ NO ○ YES | | | | | |
| | F7C | HAS A PRODUCT EMBODYING / USING THE INVENTION BEEN SOLD OR OFFERED FOR SALE TO NON-XYZ EMPLOYEES?     ○ NO ○ YES | | | | | |
| 8 | F8 | THE FOLLOWING DOCUMENTS HAVE BEEN ATTACHED TO THIS FORM: | | | | | 140 |
| | F8A | DETAILED DESCRIPTION:     ○ NO ○ YES | | | | | |
| | F8B | DRAWINGS:   ○ NO ○ YES | | | | | |
| | F8C | OTHER DOCUMENTS:    ○ NO ○ YES | | | | | |

FIG. 1

| DATA FIELD ID | ACCESS COUNT | APPEARANCE ORDER |
|---|---|---|
| F1 | 100 | 1 |
| F2 | 0 | 8 |
| F3 | 39 | 6 |
| F4 | 20 | 7 |
| F5 | 53 | 5 |
| F6 | 100 | 2 |
| F7 | 100 | 3 |
| F8 | 100 | 4 |

| 1 | F1 | TITLE OF INVENTION: | METHOD TO IMPROVE DATA ENTRY EFFICIENCY BY CHANGING THE ORDER | | | 305 |
|---|---|---|---|---|---|---|
| | F6 | OBJECTIVE OR PURPOSE OF INVENTION | | | | |
| | F6A | WHAT IS THE UNDERLYING QUESTION / PROBLEM / TASK OF THE INVENTION? | | | | |
| 2 | F6B | HOW IS THE QUESTION / PROBLEM / TASK SOLVED? | | | | 310 |
| | F6C | CLOSEST KNOW RELATED PRIOR ART? | | | | |
| | F6D | DIFFERENCES AND / OR ADVANTAGES FROM PRIOR ART? | | | | |
| | F7 | COMMERCIALISATION OF THE INVENTION | | | | |
| | F7A | HAS THE INVENTION BEEN DVUGED TO NON-XYZ EMPLOYEES? ○NO ○YES | | | | |
| 3 | F7B | IS THE INVENTION USED OR PLANNED TO BE USED BY XYZ IN A PRODUCT OR SERVICE OFFERING?  ○NO ○YES | | | | 315 |
| | F7C | HAS A PRODUCT EMBODYING / USING THE INVENTION BEEN SOLD OR OFFERED FOR SALE TO NON-XYZ EMPLOYEES?  ○NO ○YES | | | | |
| | F8 | THE FOLLOWING DOCUMENTS HAVE BEEN ATTACHED TO THIS FORM: | | | | |
| 4 | F8A | DETAILED DESCRIPTION:  ○NO ○YES | | | | 320 |
| | F8B | DRAWINGS:  ○NO ○YES | | | | |
| | F8C | OTHER DOCUMENTS:  ○NO ○YES | | | | |
| 5 | F5 | WAS THE INVENTION MADE WITHIN THE U.S.? ⦿NO  ○YES (PLEASE FILL IN BELOW) | | | | 325 |
| 6 | F3 | WAS THE INVENTION DEVELOPED IN THE COURSE OF A PROJECT DONE WITH A PERSON OR COMPANY OUTSIDE OF XYZ?  ⦿NO ○YES | | | | 330 |
| 7 | F4 | WAS THE INVENTION FUNDED DIRECTLY OR INDIRECTLY BY A PUBLIC FUNDING PROGRAM?  ⦿NO ○YES | | | | 335 |

| | | LEAD INVENTOR | INVENTOR DATA | | EMPLOYER / ON SECONDMENT | | CONTRIBUTION | |
|---|---|---|---|---|---|---|---|---|
| 8 | F2 | 1 | EMAIL: | ABC@XYZ.COM | EMPLOYER: | XYZ PVT. | 100.0 | % |
| | | | FIRST NAME: | AB | EXTERNAL INVENTOR: | ☐ YES | | |
| | | | LAST NAME: | C | ON SECONDMENT: | ☐ YES | | |
| | | | XYZ USER ID: | 1047201 | | | | |

FIG. 3

TECHNIQUE TO IMPROVE DATA ENTRY EFFICIENCY IN A USER INTERFACE

FIELD OF THE INVENTION

The invention generally relates to the field of computer based user interfaces. More particularly the invention relates to improving data entry efficiency by rearranging the data fields in the user interface based on a usage pattern of the data fields.

BACKGROUND OF THE INVENTION

Data entry is often a tedious and repetitive task, Entering a large volume of data into complex application screens is an error prone process. Users are prone to make mistakes during data entry due to the large number of fields they have to enter data into and also due to the repetitive nature of performing the same task again and again. These mistakes create delays in processing information that the application provides, leading to process delays and breakdowns. For example, consider the case of a purchase order user interface in a supplier relationship management application. The user interface is complex and users entering data are likely to make multiple mistakes before they submit the form for purchase order creation. Due to these errors, the purchase department may take a long time to process the purchase order resulting in issues like late vendor payment etc.

During repetitive data entry tasks, the user often knows the data fields that need an entry, but the nature of the user interface may be such that these data fields may not be next to each other. They may be distributed over different places in the user interface. The user interface may contain some non-mandatory fields, read-only fields and data fields with default values interspersed between the data fields that the user is required to fill. The user may not want to waste time scrolling through the user interface to find fields that require entries.

SUMMARY OF THE INVENTION

Described are methods and systems for generating a user interface with a plurality of data fields ordered in a most frequently accessed first basis. The method includes retrieving a plurality of data fields of a user interface from a user interface metadata file and retrieving an access count of each of the plurality of data fields, wherein the access count is a count of number of data entry processes in which the plurality of data fields are accessed. The plurality of data fields are arranged in a most frequently accessed first basis based on the access count of each of the plurality of data fields.

The system includes a metadata reader that interprets the user interface metadata file and retrieves the plurality of data fields. A sorting engine retrieves a count of the number of data entry processes in which each of the plurality of data fields are accessed and sorts the plurality of data fields in a most frequently accessed first basis. A user interface engine renders the user interface with the sorted plurality of data fields on an electronic display device.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 1 is an exemplary screen display of an idea submission user interface having data fields in an original order according to an embodiment of the invention.

FIG. 3 is an exemplary screen display of the idea submission user interface of FIG. 1 having the data fields sorted in a most frequently accessed first basis according to an embodiment of the invention.

DETAILED DESCRIPTION

Figure 2:
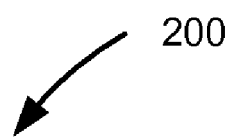
FIG. 2 is a table depicting an exemplary access count and an order of the appearance of the data fields in the idea submission user interface according to an embodiment of the invention.

Data entry process involves a user entering various data including answering questions, making selections, attaching documents etc., in a user interface form. For example, an idea submission process is one such data entry process wherein an employee of an organization submits ideas that may help the organization in improving its business. The data entry process may be made more efficient and less time consuming by arranging the data fields in the user interface in such a way that the data fields that are most likely to be accessed and accessed most of the times are presented first in the user interface. This makes it easier and quicker for the user to enter the data as it eliminates the need to scroll through the whole user interface and search for data fields that need to be answered by the user.

FIG. 1 is an exemplary screen display of an idea submission user interface 100 having data fields in an original order according to an embodiment of the invention. The idea submission user interface 100 allows a user to submit an idea by entering the details of the idea in data fields F1 105, F2 110, F3 115, F4 120, F5 125, F6 130, F7 135 and F8 140. For example, a title of the invention may be entered in the data field F1 105 "Title of the invention". The user may then proceed with entering the details of the idea by answering questions such as "What is the underlying question/problem/task of the invention?" and "How is the question/problem/task solved?" in data fields F6a and F6b respectively of a data field group F6 130. The user may or may not answer questions in data fields F6c and F6d as it is not mandatory.

The idea submission user interface 100 presents data field groups such as F7 135 and F8 140 having radio data fields in the data field group. The data field group F7 135 has radio data fields such as F7a, F7b, and F7c for which the user has to select a value "yes" or "no". Similarly, the data field group F8 140 has radio data fields such as F8a, F8b, and F8c for which the user has to select a value "yes" or "no".

The idea submission user interface 100 also presents data fields such as radio button F3 115, F4 120 and F5 125 with default values. In an embodiment, a default value is the most likely value that may be selected by the user. For example, for a question such as "Was the invention made in the U.S.?" in the data field F3 115, the default value may be set as "no". This would make the data entry process more efficient and less time consuming for the users especially in an organization where there are more employees outside of the United States as compared to within the United States. In such cases, that is, where a data field has a default value, the likelihood of the data field being modified or accessed by the user is minimized. The inventors, who are within the United States, may change the value to "yes".

The data field F2 110 presents mostly read-only data such as details of an employee. Such data fields may not be accessed by the user as there is no need to enter any data in the data field F2 110.

The nature of the data fields in the idea submission user interface 100 may be mandatory, non-mandatory, read-only, have a default value, etc. Therefore, depending on the nature of the data fields and data entry context, a data field may be accessed always, most of the time, sometimes or never by a user in a data entry process. For example, data fields F1, F6a, F6b, and data fields in data field groups F7 and F8 are mandatory. So, the data fields F1, F6a, F6b, and data fields in data field groups F7 and F8 are always accessed by the user. The data field F2 is mostly a read-only data field, and therefore is not accessed by the user. The data fields F3, F4, and F5 have a default value and therefore, may be accessed sometimes or may not be accessed at all.

The access count of the data field is determined by keeping track of the access patterns of the data fields across data entry processes. The access count of the data field is a count of number of data entry processes in which the data field is accessed by the user. Accessing a data field includes performing a user action on the data field, for example, entering a value in a data field, changing a value in the data field, making a user selection, changing the value of a radio data field, check box data field, and making a selection in a drop down data field. FIG. 2 is a table 200 depicting an exemplary access count and an appearance order of the data fields in the idea submission user interface 100 based on, for example, one hundred past data entry processes. Based on the access count, the "most frequently accessed first" order of the data fields which is the appearance order of the data fields in the user interface is also determined as shown in table 200.

In an embodiment, the access count is persisted across different logons by the same user, by different users, different sessions, and different geographies. In another embodiment, the user interface may be configured to track the access count based on parameters including a single user, multiple users, a section of users such as users in a particular geography, single session, and multiple sessions.

FIG. 3 is an exemplary screen display of the idea submission user interface 300 of FIG. 1 having the data fields sorted in a most frequently accessed first basis according to an embodiment of the invention. The data fields F1 305, F6a and F6b of data field group F6 310, data fields of data field group F7 315 and F8 320 are mandatory and hence these data fields are accessed by the user in all the one hundred data entry processes. Therefore, the above data fields have a maximum access count "100" and thus, have to appear in the idea submission user interface 300 before the other data fields F2 340, F3 330, F4 335 and F5 325. The data field F1 305 remains first, data field group F6 310 moves to the second position, data field group F7 315 moves to the third position, and data field group F8 320 moves to the fourth position as shown in the idea submission user interface 300.

The data field F5 325 having the question "Was the invention made in the U.S.?" and a default value "no" has been accessed "53" times which is more than the number of times the other data fields F3 330 (access count "39") and F4 335 (access count "20") having default values are accessed. This is because the user changed the value of the data field F5 325 to "yes" from "no" in "53" idea submission data entry processes indicating that "53" ideas were made in the United States. The data fields F5 325, F3 330 and F4 335 appear fifth, sixth and seventh in the idea submission user interface 300. The data field F2 340 with an access count of "0" is not accessed by the user since it is mostly a read-only field and appears last in the idea submission user interface 300. The original order of the data fields F1 105, F2 110, F3 115, F4 120, F5 125, F6 130, F7 135 and F8 140 in idea submission user interface 100 is now changed to F1 305, F6 310, F7 315, F8 320, F5 325, F3 330, F4 335, and F2 340 in the idea submission user interface 300 based on the most frequently accessed first order.

When more than one data field has a same access count, for example, data fields F1 305, F6 310, F7 315 and F8 320 have the same access count "100", the appearance order of these data fields in the idea submission user interface 300 is the same as their original order with respect to each other in the idea submission interface 100. That is, in the idea submission interface 100 of FIG. 1, between data fields F1 105, F6 130, F7 135 and F8 140, the data field F1 105 appears first, followed by data field F6 130, F7 135 and then finally F8 140. So, the same order is retained between these fields in the idea submission interface 300. Thus, the data field F1 305 appears first, which is followed by F6 310, F7 315 and F8 320 as shown in the idea submission interface 300.

A data field group has a group of related data fields. The data fields are grouped into a data field group based on some context that ties them together. For example, data fields F6a, F6b, F6c and F6d are grouped into data field group F6 310 based on the context "Objective or purpose of the invention". The data fields in the data field group may not be separated, that is, they have to appear within the data field group and in the same sequence irrespective of the number of times each of the data fields are accessed. Therefore, accessing a data field of a data field group is considered as accessing the data field group and not the data field of the data field group. Hence, an access count is defined on the data field group and not the data fields of the group. For example, accessing any or all data fields F6a, F6b, F6c and F6d is considered as accessing the data field group F6 310. Therefore, whenever any or all data fields F6a, F6b, F6c and F6d are accessed, the access count of data field group F6 310 is incremented and not the access count of data fields in the data field group F6 310.

Figure 4:
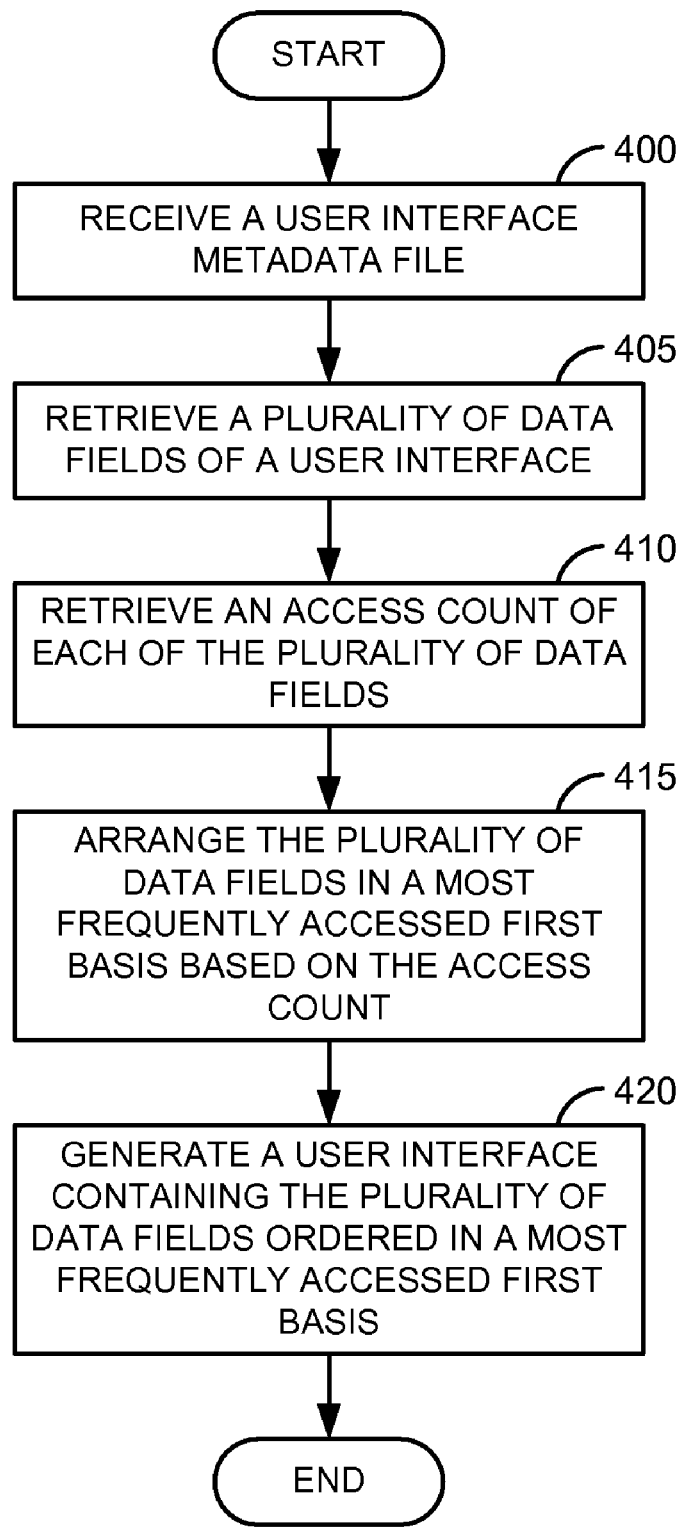
FIG. 4 is a flow diagram for sorting the data fields of the idea submission user interface in a most frequently accessed first basis based on the access count of the data fields according to an embodiment of the invention.

FIG. 4 is a flow diagram describing an exemplary method for sorting the data fields of the idea submission user interface in a most frequently accessed first basis based on the access count of the data fields according to an embodiment of the invention. At process block 400, a user interface metadata file having a definition of the user interface, for example, idea submission user interface 100 is received. The user interface metadata file contains metadata regarding the data fields, data field groups, the original order of the data fields in the user interface. The metadata includes a type of the data field such as radio button, check box, text box, drop-down list, read-only field, dimensions of the data field such as length & width, whether the data field is mandatory, whether it is a data field group and whether the data field belongs to a data field group. In an embodiment, the user interface metadata file may be received in an extensible markup language (XML) format. In another embodiment, the user interface metadata file format includes Java, Microsoft® Visual C++, hyper text markup language (HTML), Ruby, and hypertext preprocessor (PHP).

At process block 405, the data fields in the user interface are retrieved from the user interface metadata file. At process block 410, an access count of the data field is retrieved from a data store. While retrieving the access count, it is determined whether the data field is part of a data field group and if yes, an access count of the data field group is retrieved. The process block 410 is repeated for all the data fields retrieved from the user interface metadata file.

At process 415, the data fields are sorted using the access count based on a most frequently accessed first basis. When more than one data field have the same access count, the order of appearance of these data fields is the same as their original order as defined in the user interface metadata file. For example, if the data fields F5, F8 and F9 have the same access count, then their order of appearance is retained as F5, F8 and F9 itself. At process block 420, a new user interface having the data fields ordered in a most frequently accessed first basis is generated.

Figure 5:
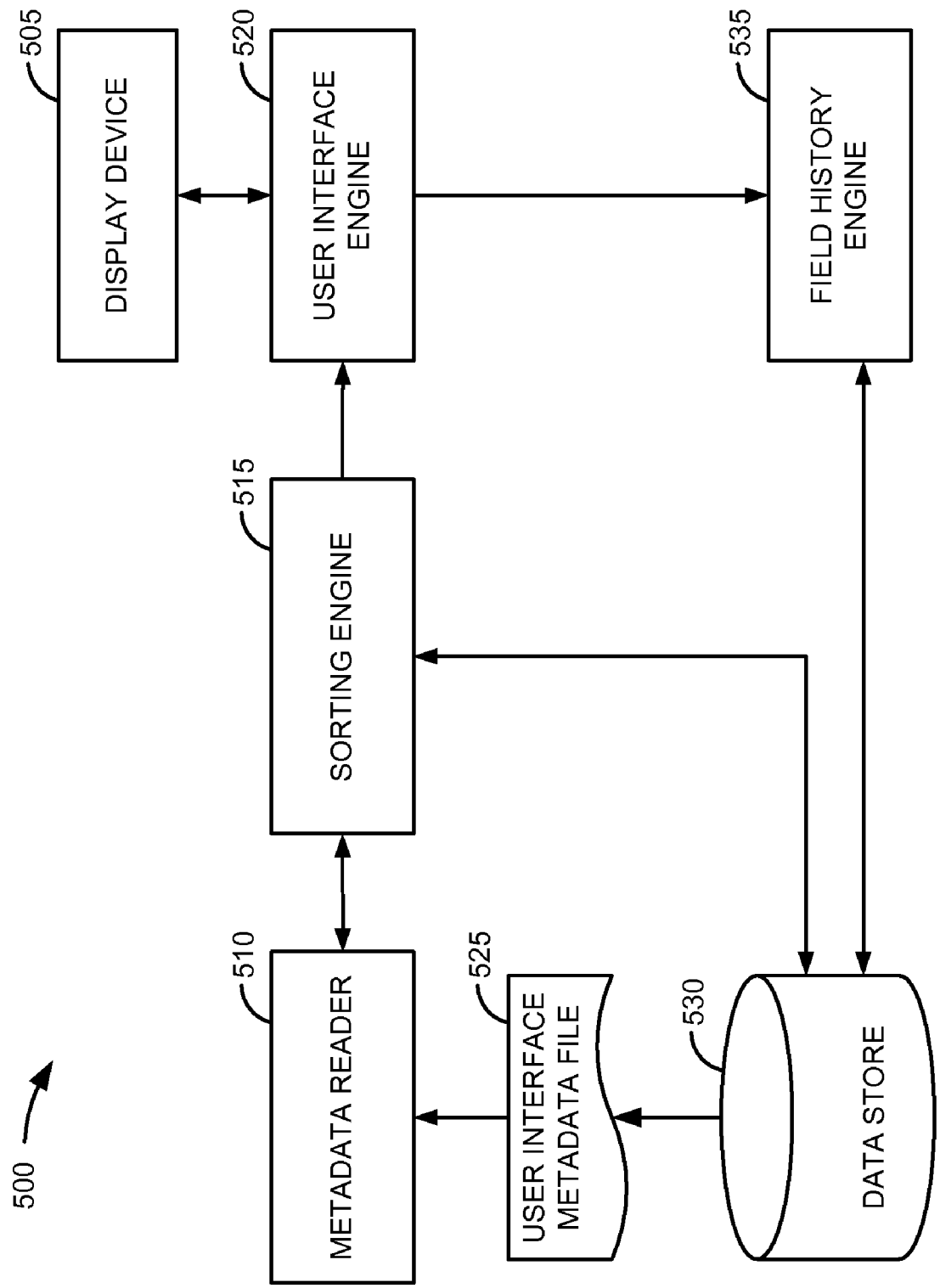
FIG. 5 is a block diagram of a system for sorting the data fields of the idea submission user interface in a most frequently accessed first basis based on the access count of the data fields according to an embodiment of the invention.

FIG. 5 is a block diagram of a system 500 for sorting the data fields of the idea submission user interface in a most frequently accessed first basis based on the access count of the data fields according to an embodiment of the invention. A user interface metadata file 525 is retrieved from a data store 530 and input to metadata reader 510. The metadata reader 510 reads the user interface metadata file 525 and retrieves the data fields in a user interface. The metadata reader 510 retrieves details including data field identifications (IDs) of the data fields and passes the data field IDs to a sorting engine 515. The sorting engine 515 obtains an access count of the data fields from the data store 530. After retrieving the access count, the sorting engine 515 sorts the data fields in most frequently accessed first basis based on the access count and provides the sorted data fields to a user interface engine 520.

The user interface engine 520 renders the user interface having the data fields sorted in most frequently accessed first basis on an electronic display device 505. The system 500 also includes a field history engine 535 that tracks access history of a data field in the user interface by recording a count of number of data processes in which the data field is accessed by the user. A data field access includes entering value in a data field, changing a value in the data fields, making a user selection, changing the value of a radio data field, check box data field, and making a selection in a drop down data field.

When the data field in the user interface is accessed by the user, the user interface engine 520 identifies the data field and passes a data field ID of the data field to the field history engine 535. The field history engine 535 updates the access count of the data field by incrementing the access count and stores the access count back in data store 530. In an embodiment, the data store 530 is a relational database. In another embodiment, the data store 530 includes a file, a hierarchical database, OLAP cube, and memory. The field history engine 535 determines whether the data field belongs to a data field group and if the data field belongs to the data field group, the access count of the data field group is updated.

Embodiments of the invention may include various steps as set forth above. The steps may be embodied in machine-executable program code which causes a general-purpose or special-purpose processor to perform certain steps. Alternatively, these steps may be performed by specific hardware components that contain hardwired logic for performing the steps, or by any combination of programmed computer components and custom hardware components.

Embodiments of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or any other type of machine-readable media suitable for tangibly storing electronic instructions. The machine readable medium can provide the instructions stored therein to a computer system comprising a processor capable of reading and executing the instructions to implement the method steps described herein.

It should be appreciated that reference throughout this specification to one embodiment or an embodiment means that a particular feature, structure or characteristic described in connection with the embodiment is included in at least one embodiment of the present invention. These references are not necessarily all referring to the same embodiment. Furthermore, the particular features, structures or characteristics may be combined as suitable in one or more embodiments of the invention.

Throughout the foregoing description, for the purposes of explanation, numerous specific details were set forth in order to provide a thorough understanding of the invention. It will be apparent, however, to one skilled in the art that the invention may be practiced without some of these specific details. The detailed description as set forth above includes descriptions of method steps. However, one skilled in the art will understand that the order of the steps set forth above is meant for the purposes of illustration only and the claimed invention is not meant to be limited only to the specific order in which the steps are set forth. Accordingly, the scope and spirit of the invention should be judged in terms of the claims which follow.

What is claimed is:

1. A computer implemented method for generating a user interface comprising a plurality of data entry fields, the method comprising:
   retrieving the plurality of data entry fields of the user interface;
   determining whether a data entry field of the plurality of data entry fields is a part of a data field group, wherein the data field group includes a group of data entry fields in an unalterable sequence;
   when the data entry field is part of the data field group, retrieving an access count of the data field group, wherein the access count of the data field group is a count of number of data entry processes in which at least one data entry field of the data field group was accessed in the past;
   when the data entry field is not the part of the data field group, retrieving an access count of the data entry field, wherein the access count of the data entry field is a count of number of data entry processes in which the data entry field was accessed in the past;
   and
   arranging the plurality of data entry fields in a most frequently accessed first basis based on the access count of the data entry fields and the access count of the data field group.

2. The computer implemented method of claim 1 further comprising generating a user interface with the plurality of data entry fields appearing in the order of most frequently accessed first basis.

3. The computer implemented method of claim 1, wherein retrieving the plurality of data entry fields comprises retrieving a structure of the user interface defined in a user interface metadata file.

4. The computer implemented method of claim 3, wherein a format of the user interface metadata file comprises an extensible markup language.

5. The computer implemented method of claim 3, wherein retrieving the plurality of data entry fields comprises retrieving the plurality of data entry fields in an original order of appearance defined in the user interface metadata file.

6. The computer implemented method of claim 1, wherein determining whether the data entry field is the part of the data field group comprises identifying the data field group of the data entry field in a user interface metadata file.

7. The computer implemented method of claim 1, wherein arranging the plurality of data entry fields comprises arranging two or more of the plurality of data entry fields in an original order when the access count of the two or more of the plurality of data entry fields is same.

8. The computer implemented method of claim 1 further comprising:
identifying a data entry field accessed by a user;
retrieving a count of number of past data entry processes in which the data entry field was accessed; and
computing the access count of the data entry field by incrementing the count of number of past data entry processes by a unit value.

9. The computer implemented method of claim 8, wherein computing the access count of the data entry field comprises:
determining whether the data entry field which is accessed by the user is part of the data field group;
retrieving a count of number of past data entry processes in which any data entry field of the data field group was accessed; and
computing the access count of the data field group by incrementing the count of number of past data entry processes by a unit value.

10. An article of manufacture, comprising:
a non-transitory machine readable storage medium having instructions for generating a user interface with a plurality of data fields, the instructions which when executed by a machine cause the machine to perform operations comprising:
retrieving a plurality of data entry fields of a user interface;
determining whether a data entry field of the plurality of data entry fields is a part of a data field group, wherein the data field group includes a group of data entry fields in an unalterable sequence;
when the data entry field is part of the data field group, retrieving an access count of the data field group, wherein the access count of the data field group is a count of number of data entry processes in which at least one data entry field of the data field group was accessed in the past;
when the data entry field is not the part of the data field group, retrieving an access count of the data entry field, wherein the access count of the data entry field is a count of number of data entry processes in which the data entry field was accessed in the past; and
arranging the plurality of data entry fields in a most frequently accessed first basis based on the access count of the data entry fields and the access count of the data field group.

11. The article of manufacture in claim 10 further comprising generating a user interface with the plurality of data entry fields appearing in an order of most frequently accessed first basis.

12. The article of manufacture in claim 10, wherein retrieving the plurality of data entry fields comprises retrieving a structure of the user interface defined in a user interface metadata file.

13. The article of manufacture in claim 10, wherein arranging the plurality of data entry fields comprises arranging two or more of the plurality of data entry fields in an original order when the access count of the two or more of the plurality of data entry fields is same.

14. The article of manufacture in claim 10 further comprising:
identifying a data entry field which is accessed by a user;
retrieving a count of number of past data entry processes in which the data entry field was accessed; and
computing the access count of the data entry field by incrementing the count of number of past data entry processes by a unit value.

15. The article of manufacture in claim 14, wherein computing the access count of the data entry field comprises:
determining whether the data entry field which is accessed by the user is part of the data field group;
retrieving a count of number of past data entry processes in which any data entry field of the data field group was accessed; and
computing the access count of the data field group by incrementing the count of number of past data entry processes by a unit value.

16. A computer system for generating a user interface comprising a plurality of data entry fields, the computer system comprising:
a memory to store program code; and
a processor communicatively coupled to the memory, the processor configured to execute the program code to cause one or more computers in a network of computers to:
persist a user interface metadata file comprising a data structure of a user interface;
retrieve a plurality of data entry fields of the user interface from the user interface metadata file; and
retrieve an access count of the plurality of data entry fields and sorting the plurality of data entry fields in a most frequently accessed first basis, wherein retrieving the access count of a data entry field comprises:
determining whether the data entry field is a part of a data field group, wherein the data field group includes a group of data entry fields in an unalterable sequence; and
when the data entry field is the part of the data field group, retrieving an access count of the data field group, wherein the access count of the data field group is a count of number of data entry processes in which at least one data entry field of the data field group was accessed in the past.

17. The computer system in claim 16, wherein the processor is further configured to compute the access count of the plurality of data entry fields based on a count of number of data entry processes in which the plurality of data entry fields are accessed.

18. The computer system in claim 16, wherein the processor is further configured to render the user interface on an electronic display device.

* * * * *